United States Patent Office 2,860,015
Patented Nov. 11, 1958

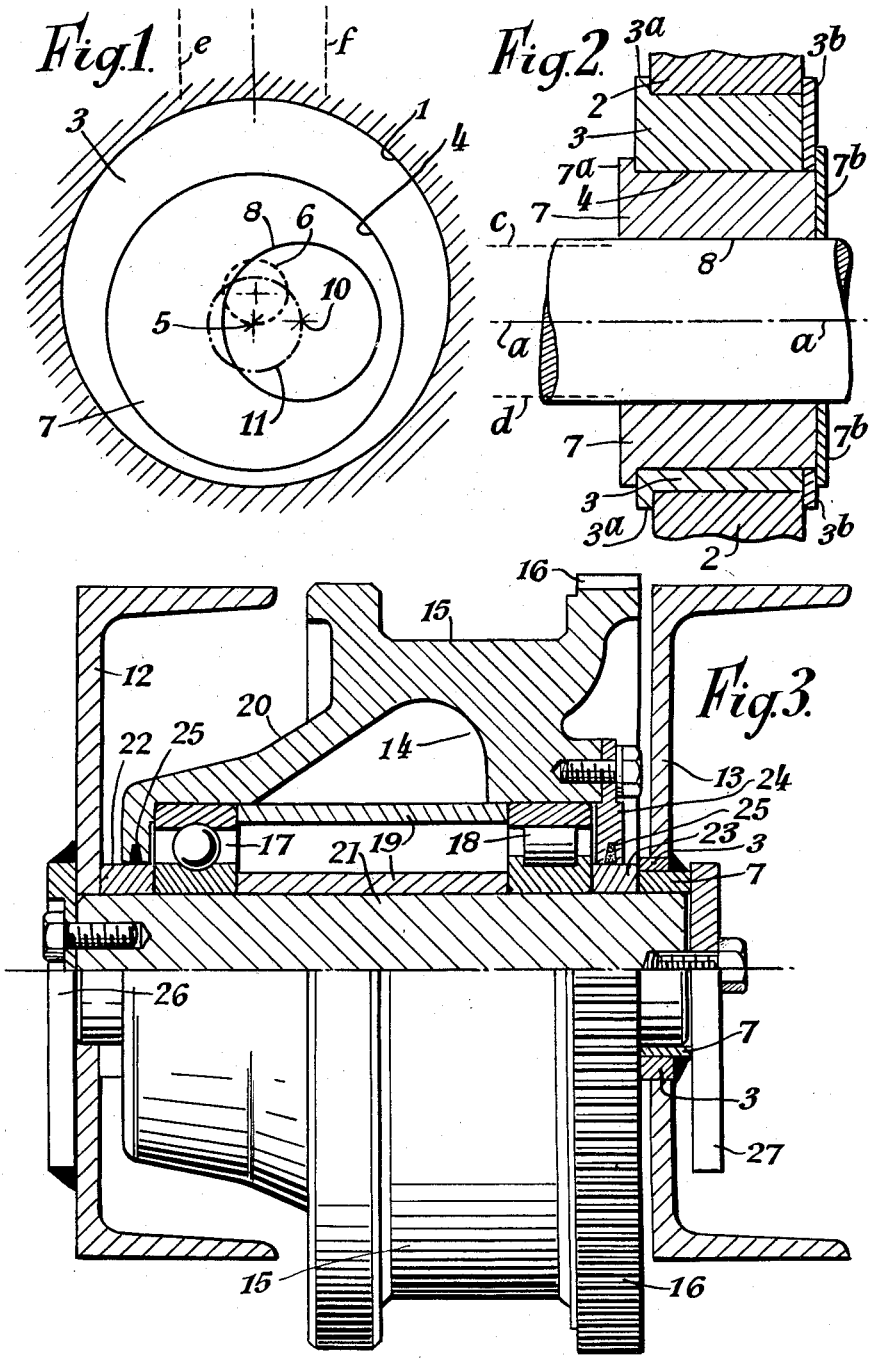

2,860,015

ADJUSTABLE MOUNTINGS FOR SHAFTS, AXLES, AND OTHER ELEMENTS

Peter Dunsforth Matterson, Rochdale, England, assignor to Doity Cranes Limited, Manchester, England, a company of Great Britain Application April 8, 1957, Serial No. 651,205

4 Claims. (Cl. 308—62)

This invention is concerned with adjustable mountings whreby the axis of a shaft, axle or the like may be brought to a selected position both laterally and vertically. One important application of the invention is to the mountings of the axles of cranes, for example the axles of the track wheels in the carriage of an overhead traveling crane, whereby substantially correct alignment between the mountings for opposite ends of an axle, or oppositely disposed co-axial shafts is readily obtainable.

An analogous use of the invention would be for aligning the mountings of railway wagon axles, and for the mountings of shafts in machinery, especially where co-axial mountings are in opposite walls of a hollow casting, or are otherwise spaced apart so as to require independent machining and thus allow of some inadvertent misalignment.

The invention is however adaptable also to other uses, for example in varying the degree of eccentricity or throw of a cam or the like. Other uses and advantages of the invention will be apparent from a consideration of the following.

According to the invention, the improved mounting comprises a pair of mutually inner and outer eccentrics with means for effecting their independent rotation, the inner eccentric being adapted for carrying the shaft, axle or the like rotatably and the outer one being adapted for rotation within the bearing housing or other receiver. With such a means the axis of the shaft may be brought to any position with infinite variation within limits determined by the relative eccentricity of the two members.

In many cases, the degree of eccentricity will be the same for each of the two ececntrics, whereby the axis of said shaft or axle may be given any desired degree of eccentricity on any diameter of the outer bearing, from zero to the sum of the two eccentricities. There may be means for locking the two eccentrics in any desired relative position and, where necessary bushes or anti-friction bearings may be provided between some or all the relatively-rotatable parts.

The invention also includes a method of assembling the mounting wherein first the two eccentrics are set to the required positions with the use of a dummy axle or shaft, the dummy is then removed and the pre-set eccentrics are welded together and to an adjacent fixture, the welding temperature used being such that the inner eccentric, when cooled, is a snug slidable and rotatable fit on the axle or shaft.

The invention therefore eliminates the necessity for very accurate machining of holes and shafts, as to their axial location, since any irregularities and mis-alignments can be corrected by adjustment of one or both eccentrics and the adjustable parts then be permanently secured together.

The outer eccentric may be incorporated into a bearing housing, or the inner into a stationary axle in some applications of the invention.

In practice, there are many cases where only one end of a shaft, axle or similar component would need to be carried in the improved eccentric mounting to obtain co-axiality, but the invention includes also the application of the adjustment means to both ends of the component, the axis of which could then be brought into the same plane as the axis of some other component or, for example, when applied to gear mechanisms, two axes could be maintained parallel at specific centre distances.

The invention will be described in more detail with reference to the accompanying drawing, wherein:

Fig. 1 is a geometric diagram to illustrate the principle of the invention;

Fig. 2 is a sectional view of a shaft mounting, to be read in conjunction with Fig. 1; and Fig. 3 is a sectional view of a shaft mounting of a track wheel for the carriage or gantry of an overhead crane, with the invention applied to one end only of the shaft.

Referring first to Figs. 1 and 2, the circle 1 in Fig. 1 represents the bore of a bearing housing shown in Fig. 2 at 2. Within the bore 1 is a bush or ring 3, in which is an eccentric opening 4. By rotation of this ring in the bore 1, the centre 5 of the eccentric opening may be moved around the circle 6 (Fig. 1).

A second bush or ring 7 is rotatably mounted in the opening 4, and this in turn has an eccentric opening 8 forming a bearing for a shaft 9. By rotation of the ring 7, the centre 10 of its eccentric opening, and therefore the axis of shaft 9, can be moved around the circle 11.

By suitable relative adjustment of the rotatable eccentrics 3 and 7, the axis $a$ of the shaft 9 can be varied to any vertical position between the limits $c$ and $d$ and to any horizontal position between the limits $e$ and $f$. Therefore, an alignment of the axis $a$ can be effected within a zone represented by a circle whose radius is the sum of the degree of eccentricity of the aperture in ring 3 and the degree of eccentricity of the aperture in ring 7. If the two apertures have the same degree of eccentricity then the minimum possible eccentricity of shaft 9 with respect to housing 2 is nil.

In Figs. 1 and 2, the eccentricity of the parts is much exaggerated for the purpose of illustration. In practice, an eccentricity in the region of $\frac{1}{16}''$ would be reasonable.

Fig. 2 also shows one possible mode of assembly and location of the parts where the eccentric 3 has a flange $3^a$ and a clamping or retaining plate $3^b$, whilst the eccentric 7 has a flange $7^a$ and a clamping or retaining plate $7^b$.

Referring now to Fig. 3, the invention is illustrated as applied to the mountings for a track wheel on a carriage for an overhead crane. In the case shown, only one end of the axle is adapted for adjustment as this is usually sufficient within the range of accuracy normal to overhead crane structures, but if desired both ends of the axle could have the double eccentric mounting.

In the drawing 12 and 13 represent structural members of the carriage whilst 14 is a track wheel having a track surface 15 and a toothed rim 16 for driving purposes. The wheel 14 is mounted on anti-friction bearings comprising the ball bearing 17 and the roller bearing 18 with spacing sleeves or collars 19 between their inner and outer races. The track wheel is extended at 20 to receive the bearing 17 at a suitable distance from the bearing 18.

The inner races are mounted on an axle 21 and are located by the collars 22 and 23, the collar 22 reacting against the frame member 12 and the collar 23 abutting the double eccentric mounting. The bearings are retained in the wheel by a retaining ring 24, and oil seals are provided at 25.

The double eccentric mounting comprises the inner and outer rings 7 and 3, the former being held on the axle 21, and the latter being held in the frame member 13. After adjustment the two eccentrics are welded to each other and to the frame, but any other suitable securing or locking means may be adopted.

The axle 21 is located endwise by the end plates 26, 27.

The invention is applicable also to face members such as, for example, flange mountings for motors, for which two equal and opposite face or axial cams as opposed to the previously mentioned radial cams would be employed to correct angular as opposed to centric misalignment.

The invention may be applied with unequal eccentrics so as to produce a minimum displacement represented by the algebraic sum of the eccentricities, for example where such displacement is intended to neutralise some other eccentricity.

What I claim is:

1. Adjustable mounting apparatus comprising a pair of spaced relatively fixed frame members, a shaft having one end portion thereof fixedly supported by one of said frame members, a double eccentric mounting supported by the other of said frame members and including an outer eccentric ring and an inner eccentric ring, said outer eccentric ring being journalled in said other frame member and said inner eccentric ring being journalled in said outer eccentric ring, said inner eccentric ring having a bore therein, the opposite end portion of said shaft being disposed and supported within said bore, means for permanently securing said inner and outer rings in fixed position relative to said other frame member, and a wheel member rotatably journalled on said shaft.

2. Apparatus as defined in claim 1 wherein said securing means comprises a weld portion fused to said inner and outer rings and to said frame member for permanently fixing these members to one another.

3. Apparatus as defined in claim 1 wherein said inner and outer eccentric rings have the same degrees of eccentricity.

4. A method of assembling a shaft in a double eccentric mounting supported in a relatively fixed frame member and having an outer eccentric and an inner eccentric with a bore therein, comprising adjusting said double eccentric mounting such that said bore receives a dummy shaft disposed in a predetermined position, removing the dummy shaft, and then welding said adjusted inner and outer eccentrics to one another and to said frame member, the welding temperature employed being such that said bore of the inner eccentric when cooled is a snug slidable and rotatable fit on said shaft.

References Cited in the file of this patent

UNITED STATES PATENTS 1,421,681   Fuegel et al. _____ July 4, 1922

FOREIGN PATENTS 28,159   Great Britain _____ A. D. 1911
920,642   Germany _____ Nov. 25, 1954